United States Patent [19]
Haagens et al.

[11] 3,987,555
[45] Oct. 26, 1976

[54] GYROSCOPIC SYSTEM AND METHOD OF DETERMINING DIRECTION

[75] Inventors: Robert G. Haagens, Walpole; Argyle Lautzenhiser, Magnolia, both of Mass.

[73] Assignee: The Laitram Corporation, New Orleans, La.

[22] Filed: Apr. 9, 1971

[21] Appl. No.: 132,799

[52] U.S. Cl. .................................. 33/324; 74/5 F
[51] Int. Cl.² ........................................ G01C 19/28
[58] Field of Search ............... 33/226 R, 204 A; 74/5 F

[56] References Cited
UNITED STATES PATENTS

| | | | |
|---|---|---|---|
| 2,716,893 | 9/1955 | Birdsall | 73/504 X |
| 3,463,016 | 8/1969 | Erdley et al. | 74/5.6 X |
| 3,557,629 | 1/1971 | Quermann | 74/5 F |

*Primary Examiner*—William D. Martin, Jr.
*Attorney, Agent, or Firm*—Schiller & Pandiscio

[57] ABSTRACT

A gyroscopic directional reference system comprising a two-degree-of-freedom gyroscope including a tuned single flexible hinge rotor and capacitance sensors for measuring the torsional displacement of the rotor about its hinge. The sensors are arranged to provide two orthogonal signal output axes and the gyroscope is suspended, for the sake of convenience, with the rotor spin axis parallel with the local earth gravity or, in order to provide maximum signal gradient, perpendicular to the earth rotation axis. A signal summing system produces an output signal which is nulled when the input axes are angularly oriented at 45° with respect to the earth rotation axis and a servo system is provided for rotating the gyroscope about its spin axis to null the output signal. Alternatively, a capacitance sensing transducer system produces an output signal representing the angular orientation of the gyro relative to the earth rotation axis.

13 Claims, 7 Drawing Figures

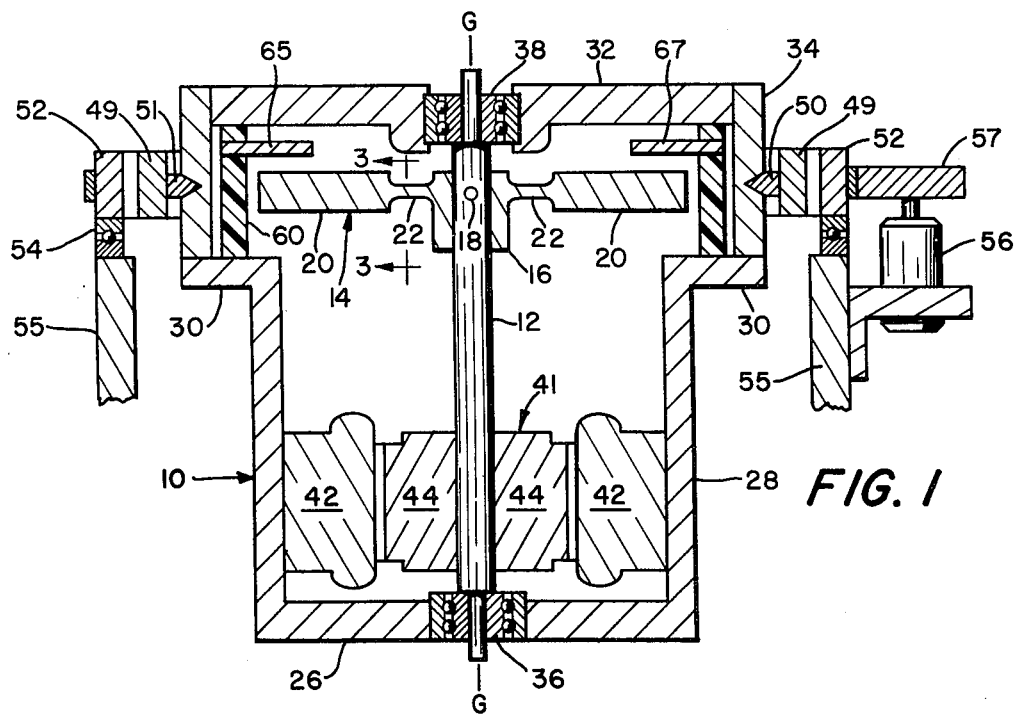
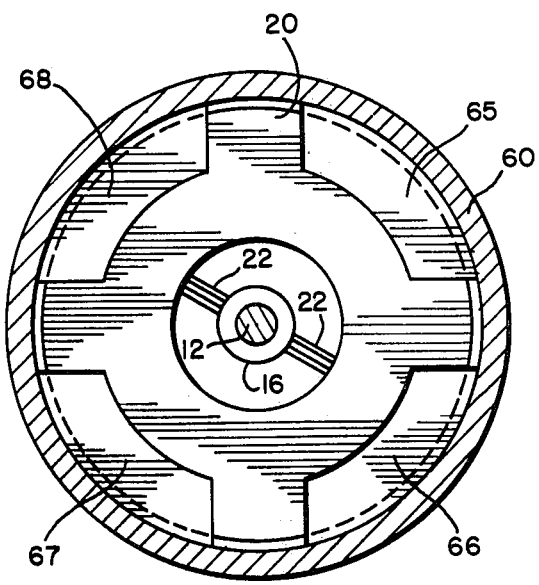
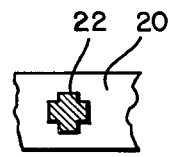
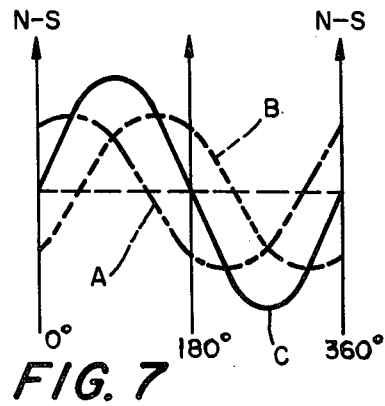
INVENTORS
ROBERT G. HAAGENS
ARGYLE LAUTZENHISER
BY
*Schiller & Pandiscio*
ATTORNEYS

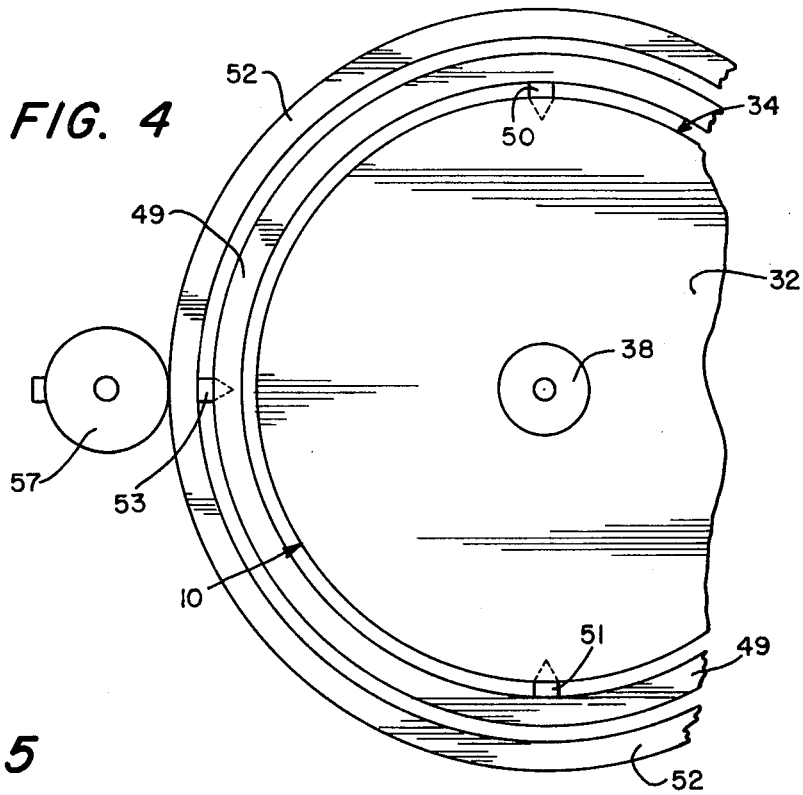
FIG. 4
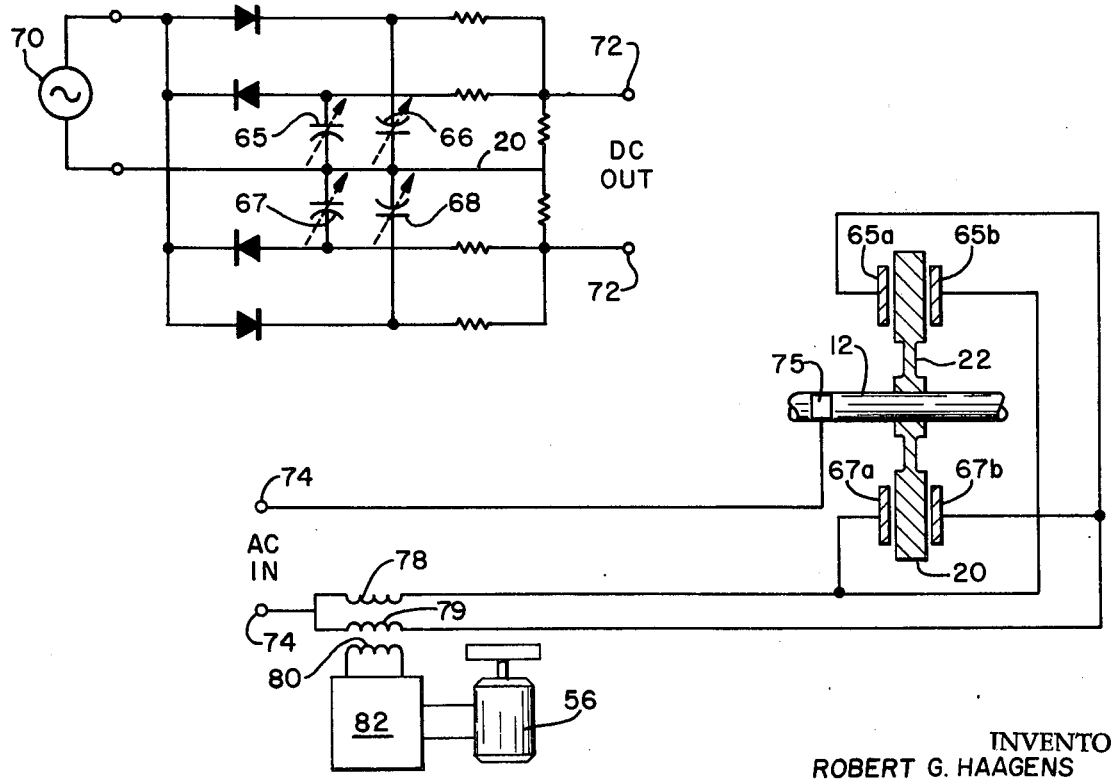
FIG. 5
FIG. 6
INVENTORS
ROBERT G. HAAGENS
ARGYLE LAUTZENHISER
BY
Schiller & Pandiscio
ATTORNEYS

GYROSCOPIC SYSTEM AND METHOD OF DETERMINING DIRECTION

The present invention is concerned with a method of and apparatus for measuring directions in azimuth relative to true north utilizing and incorporating a two-degree-of-freedom gyroscope.

Sensitive and accurate gyroscopic directional reference systems or gyrocompasses, which provide a true north reference, find substantial utility in a number of fields such as navigation and surveying, particularly in situations such as mining and well-drilling operations in which a fixed reference (such as a star) is not available from which to determine direction. A basic and known north seeking system utilizes a two-degree-of-freedom gyroscope which is suspended such that its output axis is vertical, i.e., parallel with the earth's local gravity, so that rotation of the gyroscope about an input axis perpendicular to both the spin and output axes as a result of the earth's rotation will produce a torque which causes the gyroscope to turn or precess about its output axis. Such precession tends to align the spin axis of the gyroscope with the rotational axis of the earth. Sensitive gyrocompasses of this type are usually pendulously suspended and tend to oscillate between west and east of true north, the direction of which is taken (by averaging) as the midpoint between the end points of this oscillatory motion. Gyrocompasses of this type, to be accurate, also include complex follow-up systems designed to limit the measured oscillatory displacements to azimuth rotation resulting from the earth's rotation and accordingly, are not only very expensive, but require careful handling to avoid damage, while accurate direction determination is a relatively lengthy process.

A recent development in two-degree-of-freedom gyroscope construction designed to reduce costs is the so-called "tuned single flexible hinge gyro". Gyroscopes or gyros (which terms are used synonymously) of this type include a support for a rotor comprising a shaft mounted on the support for rotation about a spin axis and a wheel mounted on a single torsional hinge for rotation about an axis (output) radially and perpendicularly disposed with respect to the gyroscope spin axis. The rotor is driven at the resonant frequency of the flexible hinge wheel to maximize torsional deflections, while damping is affected by employing fluids and/or by electromagnetic forces. Heretofore, two-degree-of-freedom gyroscopes of this type have been mounted, either pendulously or on a fixed platform, in the conventional manner with the spin axis horizontal (perpendicular to earth gravity) such that the support is free to rotate about an output axis that is vertical in response to gravitational forces and earth rotation.

Objects of the present invention are to provide a novel and improved method of determining azimuthal direction and a two-degree-of-freedom gyroscopic directional reference system useful in said method; and to provide a gyroscopic directional reference system or gyrocompass, characterized by a rugged construction, low cost and easy and dependable operation while providing a highly accurate and sensitive directional reference.

Other objects of the invention are: to provide an azimuthal direction determining method and system of the type described in which a tuned, single, flexible hinge gyroscope is suspended with its spin axis oriented vertically and/or perpendicular to the earth rotation axis; to provide a method and system as described in which electrical signals proportional to the torsional rotation of a tuned spin wheel about two orthogonal output axes are summed to produce an output signal that is nulled (i.e., algebraically summed to equal zero) when the output axes are angularly oriented at 45° with respect to the earth rotation axis; to provide a method and system as described in which servos rotate the gyroscope about its spin axis to null the output signal; and a method and system as described including a capacitance sensing and signal processing system for producing an output signal representing the azimuthal orientation of the gyroscope.

Other objects of the invention will in part be obvious and will in part appear hereinafter.

The invention accordingly comprises the method and apparatus involving the several steps and the relation and order of one or more of such steps with respect to each of the others and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is an elevational, sectional view of a gyroscope embodying the invention, the section being taken through the spin axis of the gyroscope;

FIG. 2 is a somewhat schematic view illustrating the gyro rotor and capacitance sensing system for two orthogonal output axes;

FIG. 3 is a fragmentary sectional view taken along the line 3—3 of FIG. 1, illustrating a detail of the construction;

FIG. 4 is a fragmentary plan view of the gimbal mounting and servomotor of the gyroscope of FIG. 1;

FIG. 5 is a circuit diagram of a capacitance sensing and signal summing system useful in the method and apparatus of the invention;

FIG. 6 is a fragmentary schematic view of another embodiment of a sensing and servo system useful in the invention; and FIG. 7 shows the typical signals produced by the system of FIGS. 1–5 illustrating the method and operation of the apparatus of the invention.

Generally the foregoing and other objects of the present invention are achieved in a system employing a gyroscope having a rotor which includes a gyro wheel mounted so that it is limited to rotation about the gyro spin axis and also to oscillation about a torsional axis lying in the plane of the wheel and perpendicular to the spin axis. A drive is provided to spin the rotor at a rate which matches the resonant frequency of oscillation of the wheel about the torsional axis. Means are provided for obtaining signals dependent on the modulation of the oscillation of the wheel due to interaction with the spin rate of the earth. The signals are obtained from pickups disposed along planar output axes perpendicular to one another and in the same plane as the torsional axis. The signals are summed to yield a null when the output axes just straddle, i.e., are 45° to respective sides of the true north-south direction. Means may be included for rotation of the entire gyro assembly to orient the input axis so that a null can be achieved, the rotation being, if desired, accomplished by a servo system.

Now with specific reference to FIG. 1 of the drawings, there is illustrated a two-degree-of-freedom gyroscope incorporating a dynamically tuned single flexible hinge rotor. The gyro includes a support or housing 10 in which a rotor assembly is mounted for rotation about the gyro spin axis G—G. The rotor assembly comprises a shaft 12 colinear with axis G—G and a single-axis flexible hinge rotor designated 14 mounted on shaft 12 for rotation thereby. Rotor 14, shown in plan in FIG. 2, includes hub 16 mounted on shaft 12 and secured against movement relative to the shaft by retaining pin 18 engaged in aligned bores in the hub and shaft. Rotor 14 also includes wheel 20 preferably in the form of a metallic ring or apertured disc. Wheel 20 is mounted concentrically about hub 16 on a pair of torsion hinges 22 extending radially outward from hub 16 diametrically opposite one another.

Hinges 22 are designed to prevent relative motion between the hub 16 and wheel 20 except for a limited rotation or oscillation of the wheel relative to the hub about a torsion axis (defined by a line through hinges 22) perpendicular to the gyro spin axis and thus in the plane of the wheel. Accordingly, the hinges are constructed to have maximum flexure strength in two directions orthogonal to the torsion axis, one parallel with the spin axis and the other perpendicular thereto. Cross sectional configurations such as the cruciform as shown in FIG. 3, four pointed stars, squares and the like are especially adapted to provide for torsional flexibility coupled with maximum rigidity and resistance to bending in the desired orthogonal directions.

The support of housing 10 for the rotor assembly and other components includes a cylindrical, cup-shaped section having a circular end wall 26 and cylindrical wall 28 formed with a flange 30. An opposite circular end wall 32 is secured to but separated from flange 30 by a cylindrical spacer 34. Shaft 12 is journalled at one end in a bearing 36 mounted on end wall 26 and is journalled at its other end in a similar bearing 38 mounted on end wall 32. Electric motor 41 shown schematically as including stator 42 mounted on wall 28 and rotor 44 mounted on shaft 12, is provided for driving the gyro rotor assembly. To facilitate operation at remote locations employing a source of power such as a battery, the motor may be of a conventional brushless direct current type adaptable to precise speed regulation.

Means shown in plan in FIG. 4 are provided for mounting the gyro support housing with the spin axis oriented in the desired direction. As will become apparent, the preferred orientation of the spin axis is perpendicular to the earth rotation axis because it will provide for the maximum signal gradient. However, for the sake of convenience and ease of operation, the support housing may be suspended as shown in a conventional pendulum or gimbal mounting with the spin axis vertical, that is, parallel with the direction of local gravity.

To this end an inner gimbal ring 49 is provided having a pair of diametrically opposed conical bearing cones 50 and 51 respectively mounted thereon and projecting into corresponding apertures in cylindrical spacer 34 so that housing 10 is free to rotate about the axis defined by cones 50 and 51. A second gimbal ring 52 is mounted concentrically around first ring 49 and spaced therefrom. Ring 52 also includes a pair of cones (only one 53 shown) fixed to ring 52 on diametrically opposed portions of the latter and extending into corresponding apertures in the outer periphery of ring 49. The axis along which cone 53 and its corresponding cone extend, is perpendicular to the axis of cones 50 and 51 when both rings are coplanar. It will be appreciated that housing 10 is thus able to rotate about either of the axes provided by the cones.

The outer gimbal ring is mounted for rotation in its own plane, typically on bearing 54 which in turn is mounted on a horizontal (with respect to gravity) supporting cylinder 55, typically part of a binnacle.

This support system provides a spin axis orientation which may be described as generally vertical and which will produce good results except at the higher latitudes where orientation perpendicular to the earth rotation axis becomes increasingly essential.

In a preferred embodiment of the gyro directional reference system, the mounting for the gyro support housing also includes conventional servo drives for rotating the housing about the spin axis to produce an output signal in a manner to be described hereinafter. To this end, there is provided a reversible drive or servo motor 56 mounted on support 55 and coupled as by a gear drive, friction disc or the like shown generally at 57 for rotating gimbal ring 52 and thus the entire housing.

The gyro directional reference system of the invention differs from conventional systems by virtue of a pick-off or sensing transducer system providing two output axes based on two input axes. Each input axis and its corresponding output axis are conventional insofar as they are perpendicular to one another and the gyro spin axis. However, the novel orientation of the spin axis coupled with the provision of two orthogonal output axes provide for a very high degree of accuracy and sensitivity utilizing a relatively inexpensive flexible hinge gyro, eliminate the need for complex and costly monitoring systems to assure measurement of only the torque about an output axis resulting from earth rotation relative to an input axis, enable accurate directional determinations in a relatively short time, and provide a rugged, easily portable system that can be employed in locations that are remote and accessible with difficulty.

Motor 41 is designed to drive rotor 14 at the natural resonant frequency of the torsional hinge and wheel assembly in order to achieve maximum torsional deflection in response to an input torque resulting from earth rotation, while also minimizing the restoring forces. Damping may be controlled by the choice of materials from which the hinge is formed, coatings on the torsion hinge or by controlling the configuration of the fluid-(air) filled gap between the axial surfaces of the wheel and portions of the support housing.

The gyro includes a transducer sensing system, preferably of the capacitance type, for producing electrical signals proportional to the angle of torsional deflection or rotation of the wheel about two orthogonal output axes, that is, at angular positions of the hinge or torsion axis 90° apart. Capacitance sensing elements are preferred because of their simplicity, rugged structures, resistance to mechanical shock, ease of fabrication and incorporation in the gyro structure. Capacitors have the additional advantages of not being easily affected by ambient conditions while the input forces required to produce a usable signal are negligible, so that the sensing system will have no significant effect in the torsional deflection of the rotor spin wheel.

In a simple exemplary capacitive pick up system, wheel 20 of the rotor assembly constitutes one common plate of several capacitors and the other plate or plates are mounted on cylindrical insulator block 60 around the rotor assembly. As shown in FIG. 2 particularly, the preferred embodiment employs four such other plates 65, 66, 67, 68 all in coplanar relationship spaced from and adjacent to a common surface of wheel 20, and disposed in separate quadrants symmetrically about axis G—G.

As shown in FIG. 5, the capacitors formed of wheel 20 on the one hand and plates 65, 66, 67, and 68 are all excited in common by an ac input preferably at a relatively high frequency such as 2.5 MHz and a modest voltage, e.g. 3 volts, from source 70. One side of the input line is connected in common to one side of all of the capacitors such as at wheel 20. The other side of the line is connected to each of the other plates of the capacitors through respective diodes poled so that of each pair of diametrically opposed capacitors, one charges from the input signal for a half cycle of the latter while the other charges on the next half cycle. The capacitor pairs (i.e., opposed capacitors) are connected across output terminals such as 72 through corresponding pairs of resistive impedances to provide an output dc. It will be recognized that the foregoing circuit is basically a dual diode, twin-T type of network.

In yet another form, a capacitive pick up system, as illustrated in FIG. 6 includes, instead of four single plates located to one side of the wheel as in FIG. 1, four pairs of plates (only two pairs being shown as 65a, 65b, and 67a, 67b) arranged in two planes symmetrically disposed about axis G—G. The plates of each pair are, of course, registered oppositely to one another. This arrangement has the advantage of making the output independent of axial displacement of wheel 20 resulting from play in the shaft bearings and/or flexure of hinges 22 in the direction of the gyro spin axis. Excitation current can be supplied as an ac applied at input terminals 74, one of which is coupled to the spin wheel capacitor plate through a conventional coupling such as slip ring 75 on rotor shaft 12. The other terminal 74 is connected through a respective inductance (only two, 78 and 79 being shown) to a corresponding opposed plate such that, of the two pairs of plates along each output axis or diameter across the wheel, the plate on one side of the wheel is connected to the diametrically opposed plate on the opposite side of the wheel. Output signals are determined by inductively coupling inductances such as 78 and 79 to an output coil 80. The signals from the latter are demodulated in circuit 82 and summed to provide an output servo signal which can operate servo-motor 56. This system as noted requires demodulation and is sensitive to stray capacitances so that the pick-up circuit of FIG. 5 is somewhat preferred.

In operation the gyro rotor is brought up to a desired rotational speed which is the natural resonant frequency of rotor wheel 20. The gyro is positioned within gimbal rings and support 55 so that its spin axis is oriented at least toward the earth's center and preferably perpendicular to the earth's rotational axis. As the rotor wheel interacts with the earth's spin, rotor wheel will wobble. An ac excitation current applied to plates 45, 46, 47 and 48 yields, as in the circuit of FIG. 5 a dc output. This output, which is a rectified sum, is based upon the following.

The capacitor plates aligned along one diameter output axis A will, as the rotor wobbles, provide a signal which is proportional to the amplitude of the wobble at that axis. The capacitor plates along the second output axis B, which is perpendicular to axis A, will also provide an output signal proportional to the amplitude of rotor wobble at that axis. The signals from axis A and axis B are algebraically summed and are 90° out of phase with one another because of the orientation of the respective axes from which they are derived. Because these signals are equal and opposite only when the two axes straddle or are oriented respectively 45° to opposite sides of the true N-S meridian, the sum does not null or equal zero if the A and B axes are oriented otherwise. This is graphically illustrated in FIG. 7 in which the signal amplitude for each summation from axes A and B are shown as curves A and b plotted against an abscissa of a full 360° rotation through the earth's field. Note that the direction in which the gyro housing is rotated can be identified by the polarity and slope of the signal C which is the summation of the signals from axes A and B. Thus, the signal at terminals 72 provides information of the sense of direction, and also at null of a true N-S heading. This output signal when applied through a known servo-system, shown schematically as motor 56 in FIG. 1, can be used to move the gyro housing on bearings 54 to the null position.

In situations where it is not desired or it is impractical to rotate the gyro support housing to seek a null, it is possible to provide a capacitance transducer system having separate North-South and East-West channels and vectoring the two separate output voltages to resolve north. Capacitive coupling between capacitor pick-off sectors is reduced by providing ground planes between output vectors and employing differential pulse width signal modulation to produce signals that can be converted very easily into an analog output. A differential pulse width signal modulation system suitable for this purpose and easily adapted for incorporation into the directional reference system of the invention is described, for example, in a paper entitled "Signal Transduction with Differential Pulse Width modulation", S. Y. Lee, Y. T. Li and Harvey L. Pastan, IEEE Transactions on Industrial Electronics Control Instrumentation, Vol. IECI-17, No. 2, April 1970.

It is by virtue of the novel combination of the particular orientation of the spin axis of the two-degree-of-freedom, single flexible hinge gyro, coupled with a capacitance transducer system providing two orthogonal output (and input) axes, that the gyroscopic directional reference system of the invention achieves the many advantages previously enumerated as objects of the invention.

Thus true north-south direction can be determined in two ways as noted. When it is convenient to rotate the gyro support about its spin axis, direction is determined automically, if servos are employed, by rotating the housing to orient the output axes at 45° with respect to true north thus nulling the output signal of the sensing transducer system. Alternatively, the gyro support housing may be oriented in any arbitrary azimuth and a phase sensitive, transducer sensing system incorporating capacitors in four quadrants, will produce a signal representing the azimuth of one of the output axes relative to true north. It will be seen from the foregoing that the structures of both the gyro itself and the capacitance sensing transducer system incorporated therein are simple, inexpensive and rugged, while their operation is dependable and provides rapid and accurate results.

Since certain changes may be made in the above method and apparatus without departing from the scope of the invention herein involved, it is intended that all matter contained in the above description or shown in the accompanying drawings shall be interpreted as illustrative and not in a limiting sense.

What is claimed is:

1. A method of determining azimuthal direction relative to the earth rotation axis utilizing a gyroscope comprising a support and a rotor mounted on the support for rotation about a spin axis, said rotor including a wheel mounted on a single axis torsional suspension for rotation about a torsional axis perpendicular to said spin axis, said method comprising the steps of:
   suspending said gyroscope with said spin axis oriented in a direction ranging from parallel with the direction of local gravity to perpendicular to the earth rotation axis;
   rotating said rotor about said spin axis at the resonant frequency of said torsional suspension;
   producing electrical signals proportional to the torsional rotation of said rotor about two orthogonal output axes substantially in the mean rotational plane of said wheel; and
   algebraically summing said signals to produce an output signal which is substantially nulled when said output axes are angularly oriented at 45° with respect to the true north-south meridian.

2. A method as defined in claim 1 wherein said value of said output signal is substantially zero when nulled.

3. A method of determining azimuthal direction as defined in claim 2 wherein said gyroscope support is rotated about said spin axis in a direction and angle tending to null said output signal.

4. A method of determining azimuthal direction as defined in claim 1 wherein said gyroscope support is suspended pendulously to orient said spin axis substantially parallel with the direction of local gravity.

5. A method of determining azimuthal direction as defined in claim 1 wherein said electrical signals are produced by supplying an excitation current to capacitance transducers including capacitor plates associated with said support and with said rotor.

6. A method of determining azimuthal direction as defined in claim 1 wherein said signals are modulated and converted into an output representing the angular orientation of said support.

7. In a gyroscopic directional reference system comprising a gyroscopic rotor mounted on a support for rotation about a spin axis, said rotor including a wheel mounted on a single axis torsional suspension for rotation about an output axis of said rotor perpendicular to the rotor spin axis, and drive means for rotating said rotor at substantially the resonant frequency of said torsional suspension, the improvement comprising, in combination:
   pick-up transducers including components associated with said wheel and said support arranged to produce signals proportional to the angular displacement of said wheel relative to said support about two orthogonal output axes substantially in the mean rotational plane of said wheel
   signal processing means coupled with said transducers, for algebraically summing said signals so as to produce an output signal that is nulled when said positions of said orthogonal output axes are angularly oriented at 45° with respect to the true north-south earth meridian; and
   means for suspending said support such that said spin axis is oriented in a direction ranging from parallel with the direction of local gravity to perpendicular to the earth rotation axis.

8. A gyroscopic reference system as defined in claim 7 including servo means coupled with said signal processing means for rotating said support about said spin axis in a direction and for an angle tending to null said output signal.

9. A gyroscopic reference system as defined in claim 7 wherein said pick-up transducers are capacitors including plates associated with said wheel and with said support, said plates associated with said wheel being located in a common plane and said plates associated with said support being located in a common plane perpendicular to said spin axis.

10. A gyroscopic reference system as defined in claim 9 wherein said capacitors are located in quadrants 90° apart and further including a differential pulse width modulation signal processing system incorporating said capacitors for producing an output signal representing the azimuthal orientation of said support relative to true north.

11. A gyroscopic reference system as defined in claim 8 wherein said capacitors include at least two pairs of plates, the plates of each pair being located on one of said orthogonal positions of said output axis adjacent opposite sides of said spin axis.

12. A gyroscopic reference system as defined in claim 11 including means for supplying an excitation current to said plates mounted on said wheel.

13. A gyroscopic reference system as defined in claim 7 wherein said pick-up transducers comprise capacitors including at least four plates mounted in a common plane on said wheel and equally angularly spaced around said wheel in four quadrants; and at least a pair of plates mounted on said support in a common plane perpendicular to said spin axis and located adjacent said plane of said plates on said wheel, the last-mentioned pair of plates being located on an axis intersecting said spin axis.

* * * * *